UNITED STATES PATENT OFFICE.

OSCAR BALLY, OF MANNHEIM, GERMANY, ASSIGNOR TO THE BADISCHE ANILIN AND SODA FABRIK, OF LUDWIGSHAFEN, GERMANY.

ANTHRAQUINONE DERIVATIVE AND PROCESS OF MAKING SAME.

SPECIFICATION forming part of Letters Patent No. 631,608, dated August 22, 1899.

Application filed April 12, 1899. Serial No. 712,765. (No specimens.)

*To all whom it may concern:*

Be it known that I, OSCAR BALLY, doctor of philosophy, a citizen of the Swiss Republic, residing at Mannheim, in the Grand Duchy of Baden and Empire of Germany, have invented new and useful Improvements in the Manufacture of Tri-Brominated Derivative of 1.5-Diamido-Anthraquinone, (for which application for patent was made in Germany, No. B 23,557, October 15, 1898,) of which the following is a specification.

I have discovered that 1.5-diamido-anthraquinone on treatment with bromin is converted into brom-substituted products. These are valuable as initial materials for the production of coloring-matters of the anthracene series.

I obtain my new brominated derivatives of 1.5-diamido-anthraquinone by treating this body in a solvent, such as glacial acetic acid with an excess of bromin. According to the vigor with which the bromination is effected either a di-bromo-derivative or a tri-bromo-derivative is obtained, and in the present application for patent I desire to claim the tri-bromo derivative and the process for obtaining it, and I do not claim the process for the production of the di-bromo-derivative and that product which form the subject-matter of a separate application of even date herewith, filed April 12, 1899, Serial No. 712,764.

The following example will serve to illustrate the manner in which the invention can be carried into effect and the brominated compounds obtained.

Example: Dissolve about ten (10) parts of 1.5-diamido-anthraquinone in about one thousand five hundred (1,500) parts of boiling glacial acetic acid. Add carefully twenty (20) parts of bromin, and raise the temperature once more to the boiling-point. An energetic evolution of hydrobromic acid takes place. Continue to boil until this leaves off. On cooling the brom-derivative separates out and is collected by filtering and drying and constitutes a brown powder. It can be recrystallized from nitro-benzene when it is obtained in the form of brown needles. On chemical analysis it can be shown to possess the composition of a tri-brom-1.5-diamido-anthraquinone. It is with difficulty soluble in alcohol, glacial acetic acid, benzene, and nitro-benzene; but it is more soluble in these reagents when boiling.

Now what I claim is—

1. Process for the production of tri-brom-1.5-diamido-anthraquinone, by energetically treating 1.5-diamido-anthraquinone with bromin, at a high temperature, in the presence of a solvent, substantially as hereinbefore described.

2. As a new article of manufacture the tri-bromo-diamido-anthraquinone which crystallizes from nitro-benzene in the form of fine brown needles, and which is with difficulty soluble in cold alcohol, glacial acetic acid, benzene and nitro-benzene, somewhat easily soluble in these solvents when boiling, substantially as described.

In testimony whereof I have hereunto set my hand in the presence of two subscribing witnesses.

OSCAR BALLY.

Witnesses:
ERNEST F. EHRHARDT,
J. L. HEINKE.